Oct. 4, 1955
C. W. PADDICK
2,719,732
OVERLOAD RELEASE HITCH
Filed Feb. 17, 1953
2 Sheets-Sheet 2
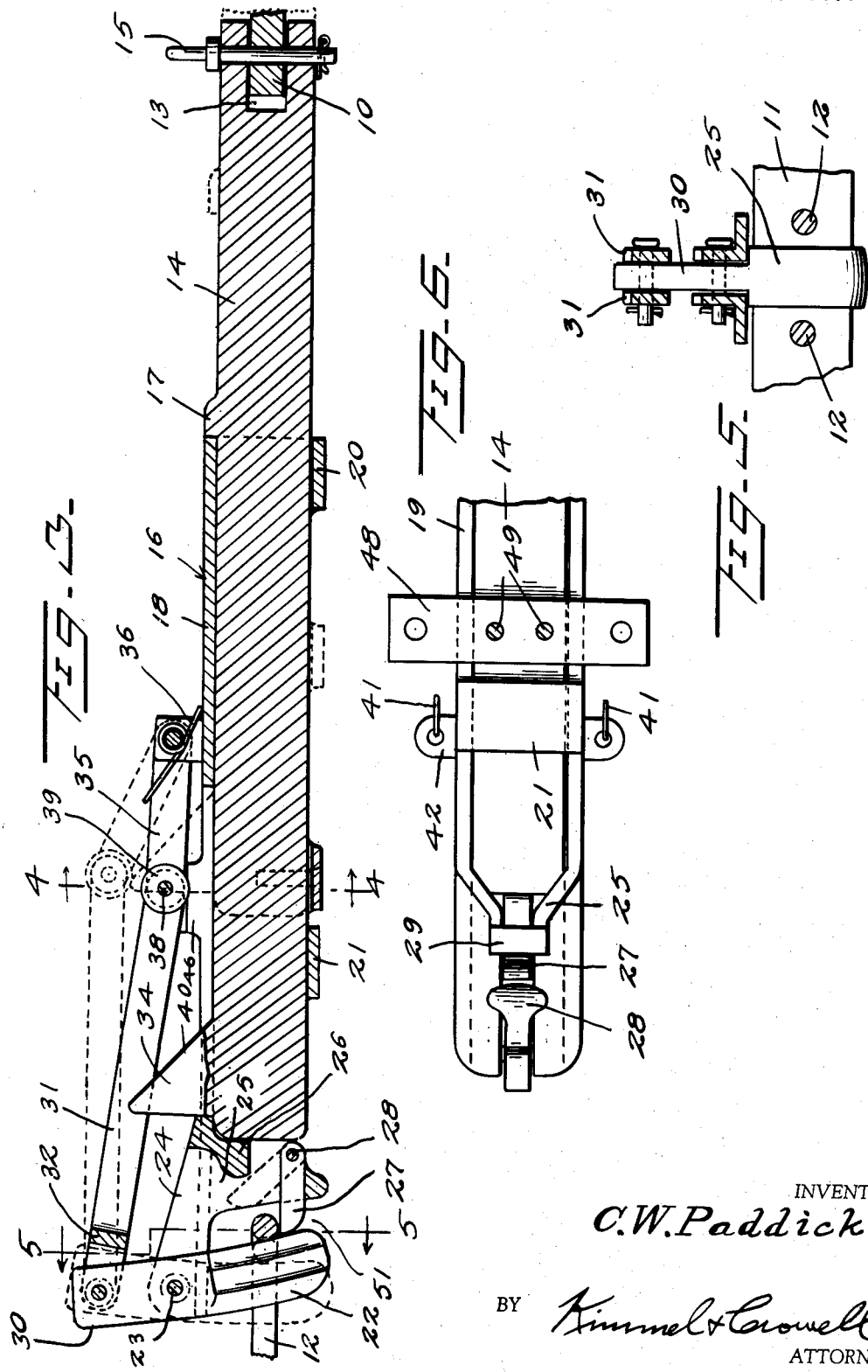
INVENTOR
C. W. Paddick
BY Kimmel & Crowell
ATTORNEYS

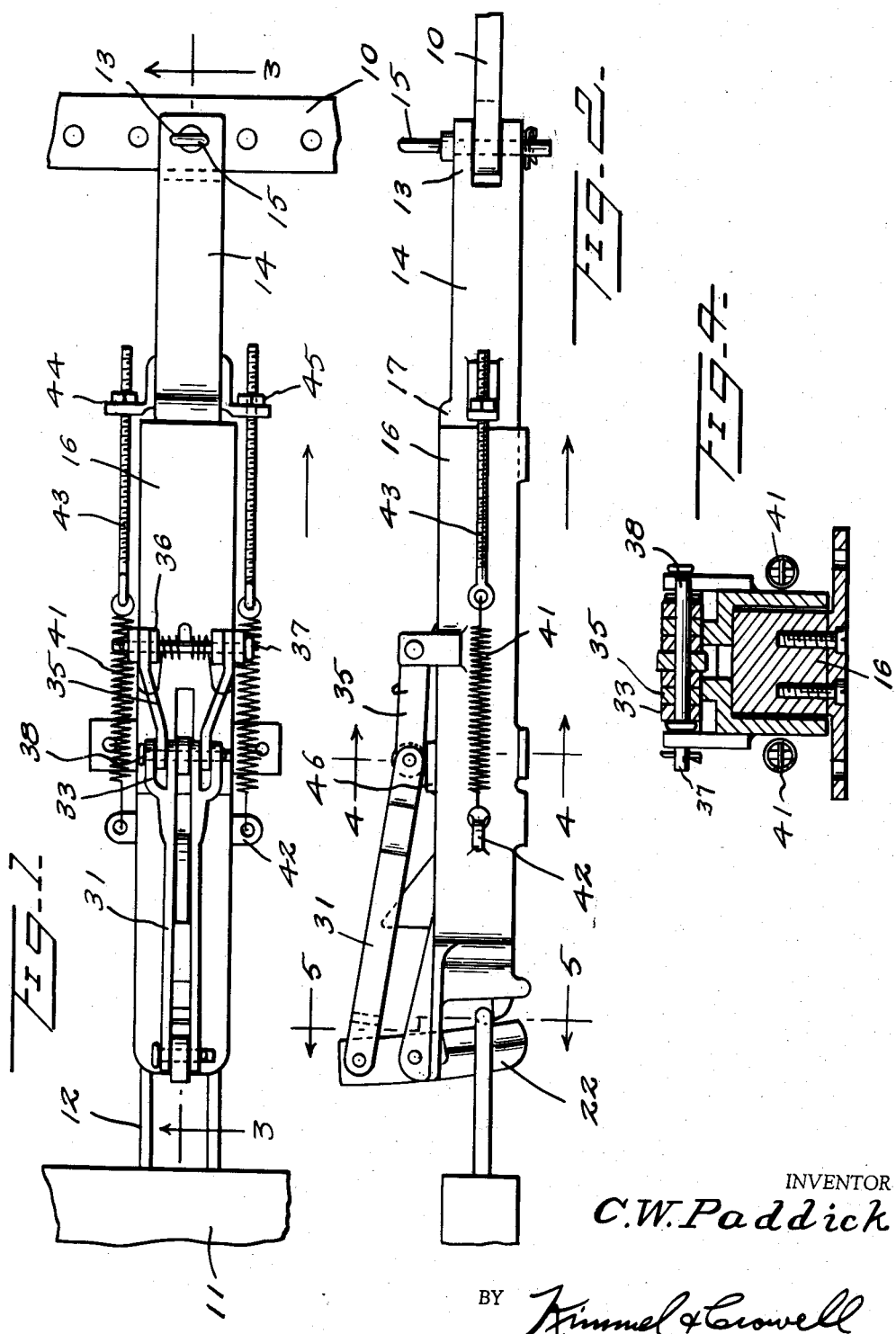

United States Patent Office 2,719,732
Patented Oct. 4, 1955

2,719,732
OVERLOAD RELEASE HITCH
Charlie W. Paddick, White Lake, S. Dak.

Application February 17, 1953, Serial No. 337,321

1 Claim. (Cl. 280—453)

This invention relates to hitches.

An object of this invention is to provide an improved hitch for securing a trailer vehicle or implement to a tractor vehicle wherein the trailer vehicle or implement will be automatically released when the pulling strain on the hitch exceeds a predetermined strain.

Another object of this invention is to provide a hitch which will automatically return to reset position after release of the trailer or implement.

A further object of this invention is to provide a hitch embodying a coupling bar or guide with a slide on the bar, and the slide being under spring tension so as to normally cushion the pulling strain until the latter exceeds a predetermined degree whereupon the latch carried by the slide will be released so as to uncouple the trailer from the tractor.

With the above and other objects in view, my invention consists in the arrangement, combination and details of construction disclosed in the drawings and specification, and then more particularly pointed out in the appended claim.

In the drawings:

Figure 1 is a plan view of a hitch constructed according to an embodiment of this invention.

Figure 2 is a detailed side elevation of the device.

Figure 3 is a sectional view taken on the line 3—3 of Figure 1.

Figure 4 is a sectional view taken on the line 4—4 of Figure 2.

Figure 5 is a sectional view taken on the line 5—5 of either Figure 2 or 3.

Figure 6 is a fragmentary bottom plan of the device.

Referring to the drawings, the numeral 10 designates generally the draw bar of a tractor vehicle, and the numeral 11 designates a trailer vehicle or implement having a U-shaped coupling member or clevis 12 projecting therefrom. In order to provide a means whereby the trailer 11 may be coupled to the tractor 10 in a manner whereby excessive strain or pull will permit uncoupling of the trailer 11 from the tractor 10, I have provided an elongated bar or guide 14 which is formed with a bifurcated forward end 13 adapted to straddle the draw bar 10 and to be secured thereto by means of a coupling pin 15.

A U-shaped slide member 16 is slidable on the bar 14 and is limited as to its forward movement on the bar 14 by means of a stop lug 17, which is fixed on the upper side of bar 14. The slide member 16 is formed of a top wall 18 and depending side walls 19. A pair of connecting members 20 and 21 are connected between the lower edges of the side walls 19 and engage beneath the bar 14.

A coupling lever or lug 22 is pivotally mounted on a pivot 23 carried by a pair of rearwardly projecting arms 24 which are fixed to the rear of the slide 16. The arms 24 also include downwardly projecting ears 25 and a transverse stop member 26 connected between the ears 25 and forming a stop against which the rear end of the bar 14 is adapted to normally engage.

As shown in Figure 6, the ears 25 are formed by bending the side walls 19 inwardly in rearwardly convergent relation. The locking lever or lug 22 is adapted to engage within the clevis or coupling link 12, and a pivoted locking bolt 27 is pivotally carried between the ears 25 below the stop member 26 on a pivot 28 and a connecting bar 29 is fixed between the lower ends of the ears 25 and forms a rest for the locking member 27 for holding the latter in locking position, as shown in Figure 3.

The locking member 27 is adapted to normally engage beneath the clevis or link 12 and the latter is inserted about the lever 22 by upward movement of the link or connecting member 12 so as to raise the locking member 27 to the dotted released position, as shown in Figure 3. The lever or lug 22 is formed with an upward projection 30 with which a pair of links 31 are pivotally connected. The links 31 are fixed together at their rear ends by a connecting member 32, and each link 31 is formed at its forward end with a fork 33.

A releasing cam 34 is fixed to the rear of the bar 14 and loosely engages between the links 31. A pair of short links 35 are pivotally mounted between upstanding ears 36 carried by the top wall 18 of slide 16, the links 35 being pivotally mounted on a common pivot 37 extending through the ears 36. The rear ends of the links 35 are pivotally connected to the forked forward ends of the links 31 by means of a pivot member 38. A roller or disc 39 is loosely mounted on the pivot 38 between the inner arms of the links 31 in a position to be engaged by the upwardly and rearwardly sloping side 40 of cam 34 when slide 16 moves rearwardly under undue pulling strain.

Slide 16 is constantly urged forwardly by means of a pair of springs 41 which are secured at their rear ends to outwardly projecting ears 42 fixed to the side walls. The forward ends of the springs 41 are secured to spring tensioning bolts 43 which engage through outwardly projecting ears 44 carried by the bar 14.

Nuts 45 are threaded on the bolts 43 and bear against the forward sides of the lugs 44. In the normal locked position of the lever 22, the links 31 and 35 will be in a lowered position and will be disposed at an obtuse angle which extends downwardly and the links will engage an upwardly projecting stop member 46 carried by the top wall 18 of slide 16.

A spring 47 engaging about the pivot member 37 constantly urges the links 31 and 35 to rock downwardly and to normally engage the stop member 46. Where it is desired to secure the hitch to a truck body or chassis, the bar 14 may be bolted to the rear of the chassis or truck body by means of a transversely disposed bar 48, which is secured by fastening members 49 to the bar 14.

In the use and operation of this device, the bar 14 is secured to the tractor draw bar 10 by the coupling pin 15 and coupling link 12 is secured to the rear of the slide 16 by inserting the link 12 in the space 51 which is disposed between the lever 22 and the rear edges of the ears 25. Upward movement of the link or coupling member 12 will raise locking member 27 and after coupling member 12 is inserted about the lever or lug 22, locking member 27 will drop downwardly beneath the link or coupling member 12.

In the event the trailer or implement 11 is under normal pulling strain, the lever locking links 31 and 35 will be disposed in their lower full-line position shown in Figure 3.

In the event an undue pulling strain is encountered, slide 16 will bodily move rearwardly against the tension of springs 41 until roller 39 engages the sloping edge 40 of cam 34. At this time, the locking angle of links 31 and 35 will be broken and these links will be raised upwardly to the dotted released position shown in Figure 3.

When links 31 and 35 are in their upper released position, lever 22 will be swung rearwardly to the dotted position so that clevis or coupling member 12 may slide downwardly below the lower end of lever or lug 22.

I do not mean to confine myself to the exact details of construction herein disclosed, but claim all variations falling within the purview of the appended claim.

What is claimed is:

A trailer hitch comprising a bar for connection at its forward end with a tractor, a slide carried by said bar arms carried by said slide, a latching lever pivotally carried by the rear of said arms, a pair of lever locking links pivotally connected together, means pivotally connecting one of said links to said lever, means pivotally securing the other of said links to said slide, a spring engaging one of said links and normally urging said links to swing downwardly to an overcenter locking position with said links disposed on an obtuse angle inclined downwardly toward said slide, a cam fixed to said bar adjacent the rear of the latter adapted upon rearward movement of said slide to engage the connection between said links to thereby raise said links to released position, spring means constantly urging said slide forwardly, and means tensioning said spring means, ears dependingly carried by said arms, and a locking bolt pivotally carried by said ears.

References Cited in the file of this patent

UNITED STATES PATENTS

| | | |
|---|---|---|
| 1,344,482 | Buller | June 22, 1920 |
| 1,362,863 | Hart | Dec. 21, 1920 |
| 1,419,265 | Johnston | June 13, 1922 |
| 1,595,867 | Paddick et al. | Aug. 10, 1926 |
| 1,613,597 | Altgelt | Jan. 11, 1927 |
| 1,811,267 | Gemberling et al. | June 23, 1931 |